Patented June 15, 1948

2,443,473

UNITED STATES PATENT OFFICE 2,443,473

PHOSPHORIC ACID ESTER OF VITAMIN A

Nicholas A. Milas, Belmont, Mass., assignor to Research Corporation, New York, N. Y., a corporation of New York No Drawing. Application September 17, 1943, Serial No. 502,837

1 Claim. (Cl. 260—461)

The object of the present invention is the production of water soluble derivatives of fat soluble vitamin A. Such derivatives possess certain advantages over the fat soluble vitamin itself such as that they are more readily assimilated and efficiently utilized by the body, and that they are more easily administered in aqueous food products, such as milk. Due to their efficient utilization and the fact that they are relatively free of the objectionable odor, taste, and consistency of some of the natural sources of the vitamin, such as the fish liver oils and concentrates they may be administered effectively and unobjectionably in relatively large doses.

This application is a continuation in part of my application Serial No. 406,674 filed August 13, 1941, now abandoned, which in turn was a continuation in part of my application Serial No. 199,726, filed April 2, 1938 (now Patent No. 2,296,291), and the present invention will be described in connection with the general methods for the preparation of water soluble derivatives of the fat soluble vitamins A, D and E disclosed in said applications.

It is well known that the fat soluble vitamins are completely insoluble in aqueous solutions. This property is due to the presence in each vitamin molecule of a relatively large non-polar portion attached to an hydroxyl group. To effect solubility of these vitamins in aqueous liquids one must synthesize certain of their derivatives which should not only contain enough polar groups to carry the active vitamin portion of each molecule into aqueous solution, but should also be capable, after being administered, of liberating the vitamins themselves in a utilizable form. This can be accomplished by preparing the alkali metal, i. e. lithium, sodium, or potasssium, salts of such acid esters of these vitamins as are easily hydrolyzed in the body to yield the vitamins in a utilizable form. It has been found that these derivatives are relatively soluble in water and are easily and more effectively administered in this form, especially when the solutions are sweetened with a small amount of cane or any other sugar.

The present invention, therefore, deals more specifically with the preparation of the vitamin acid esters of acids, such as organic dicarboxylic acids, organic sulfocarboxylic acids, and polybasic acids of sulfur, boron and phosphorus, the lithium, sodium, and potassium salts of which are relatively soluble in water. For the synthesis of these acid esters and their salts the following methods have been employed and specific examples will be given to illustrate some of them.

The methods employed may be divided into two general classes:

I. Metallic salts of vitamins or vitaminates, analogous to alcoholates, may be formed by replacing the hydrogen atom of the hydroxyl group of the vitamin with a metal or metal group, such as Li, Na, K, Ca, Ba, Sr, Zn—MgX (X=halogen atom)—Al(R₂) or —B(R₂) (R=hydrocarbon radical). To form the ester salts these vitaminates are allowed to react with equimolecular quantities of anhydrides or oxyhalides of polybasic acids; for example the anhydrides of dicarboxylic acids, such as succinic, maleic, adipic, camphoric, phthalic and naphthalic acids, or of derivatives of phthalic acid, such as 3-nitrophthalic acid or of o-sulfonbenzoic acid or the like; the oxychlorides of polybasic acids, such as oxychloride of phosphorus and other ester-forming derivatives of polybasic acids, such as boric anhydride, dioxane sulfotrioxide, dioxane di-sulfotrioxide, sulfuryl chloride and the sodium salt of chlorosulfonic acid. In the case of phosphorus oxychloride and sulfuryl chloride the initial products formed are hydrolyzed with dilute alkalies to form the phosphoric acid and sulfuric acid ester salts of the vitamins, respectively.

With this general method the step which comprises the preparation of the vitaminates is of fundamental importance, since it separates the vitamins from hydrocarbons and other inert materials which are usually associated with the vitamins in the non-saponifiable portion of the vitamin-containing oils.

(a) The metallic vitaminates can be easily prepared by allowing the vitamins to react with alkali metal alkyls or aryls, such as, for example, sodium or potassium or lithium phenyl, or lithium, sodium or potassium triphenyl methyl (C₆H₅)₃CNa (K, Li), or sodium lithium or potassium diphenyl methyl (C₆H₅)₂CHNa (K, Li), or any other metallo-organic compound of this type. A similar reaction may be carried out using the alkali metal addition compounds of naphthalene and anthracene which react with alcohols to replace the hydrogen of the OH group of the alcohol by the alkali metal. In the case of sodium triphenyl methyl, which is highly colored, one can determine the end point of the reaction by observing the disappearance of the color. The reaction may be represented as follows:

ROH + (C₆H₅)₃CNa → RONa + (C₆H₅)₃CH where R represents the hydrocarbon portion of the vitamin. The alkali metal vitaminates thus formed are relatively insoluble in petroleum ether (mixed pentanes, etc.) and can be easily separated from the hydrocarbons formed and those that are initially present in the oils containing the vitamins by extracting the reaction mixture several times with this solvent.

(b) The alkali metal vitaminates may also be prepared by allowing the vitamins to interact with the alkali metal salts of tertiary alcohols whereby the alkali metal of the tertiary alcoholates exchanges position with the hydrogen of the hydroxyl group of the vitamins. Using potassium tertiary butylate, this may be illustrated as follows:

$$ROH + (CH_3)_3COK \rightarrow ROK + (CH_3)_3COH$$

(R represents the hydrocarbon portion of the vitamin).

The tertiary alcohol is then removed under reduced pressure and the residue extracted several times with petroleum ether to remove any hydrocarbons or other inert substances present in the original oil. A similar reaction may be carried out with the alkali metal tertiary amylates.

(c) A third method for the production of the metal vitaminates consists in the interaction of the alkali or alkaline earth metals in a mixture of liquid ammonia and ethyl ether, or the metal amides in the same mixture, with the vitamins as shown below.

$$ROH + H_2NK \rightarrow ROK + NH_3$$

(R represents the hydrocarbon portion of the vitamin).

The ammonia is then allowed to evaporate, the ether removed under reduced pressure, and the residue extracted as before with petroleum ether.

(d) Other vitaminates may also be prepared by allowing the vitamins to react with equimolecular quantities of organometallic substances such as the Grignard reagent, zinc alkyls, aluminum alkyls, and boron alkyls as illustrated by the following equations:

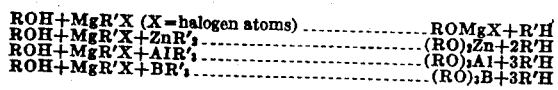
$$ROH + MgR'X \text{ (X = halogen atoms)} \longrightarrow ROMgX + R'H$$
$$ROH + MgR'X + ZnR'_2 \longrightarrow (RO)_2Zn + 2R'H$$
$$ROH + MgR'X + AlR'_3 \longrightarrow (RO)_3Al + 3R'H$$
$$ROH + MgR'X + BR'_3 \longrightarrow (RO)_3B + 3R'H$$

(R represents the hydrocarbon portion of the vitamin).

In all these cases the salts of the vitamins may be separated by the same methods as described in connection with the alkali metal alkyls.

It will be appreciated that the foregoing merely represent the types of reactions which may be employed for the production of the vitaminates and are not intended to represent a disclosure of every reagent which may be employed for replacing the hydrogen of the hydroxyl group of the vitamins by a metal or metal-containing group.

To prepare the acid esters, the metal vitaminates, prepared by the various methods described in the foregoing paragraphs, are suspended in anhydrous ethyl ether and the mixture treated with equimolecular quantities of the anhydrides or oxyhalides of dicarboxylic acids, boric anhydride, phosphorus oxychloride, sulfuryl chloride, or sodium chlorosulfonate, etc. In the first and last cases, i. e., with the anhydrides of dicarboxylic acids and sodium chlorosulfonate, the salts of the mono-esters are formed directly; whereas, in the second and fourth cases, i. e., with phosphorus oxychloride and sulfuryl chloride, after careful hydrolysis the salts of the phosphoric and sulfuric acid esters are formed, respectively. In all cases the acid esters can be purified by releasing them from their salts, preferably by acidification with dilute solutions of oxalic or phosphoric acids, although in the case of the phosphoric acid or sulfuric acid esters stronger acids are necessary. The esters are then recrystallized and their lithium, sodium, or potassium salts can be easily made by treating ethereal solutions of the esters with the corresponding carbonate or bicarbonate salts of the metals. As will appear from the following examples, the vitamins are protected during treatment by operation in a non-aqueous solvent, such as ethyl ether, benzene, or petroleum ether free from peroxides and unsaturates and in the presence of an inert atmosphere, such as purified nitrogen. Typical reactions representing the conversion of the vitaminates into esters are as follows:

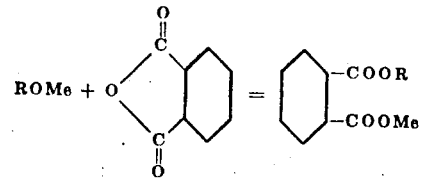

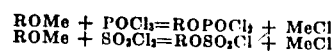
$$ROMe + POCl_3 = ROPOCl_2 + MeCl$$
$$ROMe + SO_2Cl_2 = ROSO_2Cl + MeCl$$

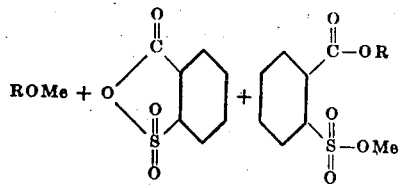

(Me stands for metal)

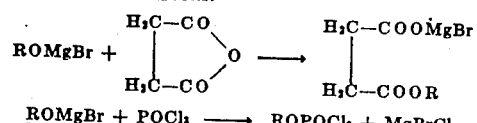

$$ROMgBr + POCl_3 \longrightarrow ROPOCl_2 + MgBrCl$$
$$ROMgBr + SO_2Cl_2 \longrightarrow ROSO_2Cl + MgBrCl$$

(R represents the hydrocarbon portion of the vitamin).

EXAMPLE 1

Sixty-nine thousandth (0.069) gram of a vitamin residue having a vitamin A potency of 563,000 U. S. P. XI units per gram and a vitamin D potency of 10,500,000 U. S. P. XI units per gram (on the basis that pure vitamin A is equivalent to 3,000,000 U. S. P. XI units per gram and that pure vitamin D is equivalent to 44,000,000 U. S. P. XI units per gram the amounts of vitamins A and D in this residue are 0.013 gram and 0.0166 gram, respectively) obtained from albacore liver oil (see my Patent No. 2,173,629, September 19, 1939) was dissolved in about 50 cc. anhydrous ethyl ether (free from oxygen and peroxides) and the solution titrated in an atmosphere of nitrogen against sodium triphenyl methyl in anhydrous ether until the color of the solution was permanent reddish-brown. The mixture was allowed to stand at room temperature for two hours, then camphoric anhydride was added in slight excess of the amount necessary to convert the vitamins into the sodium salt of the mono-vitamin esters. The resulting mixture was allowed to stand at room temperature over night. The ether was then removed under reduced pressure in an atmosphere of nitrogen, and the residue extracted with 4X25 cc. of oxygen-free water. The extract was filtered and the filtrate acidified with about 5% phosphoric acid and extracted with petroleum ether (free from unsaturates and peroxides), the mono-camphoric acid esters of the vitamins going into the petroleum ether. The petroleum ether extract was then dried over anhydrous sodium, calcium or magnesium sulfates and assayed for vitamins A and D. The total amount of residue as vitamin esters was found to be 0.08 gram. This had a potency of 308,000 U. S. P. XI units per gram of vitamin A and 5,950,000 U. S. P. XI units per gram of vitamin D. These figures correspond to a yield of 100% of the mono-acid vitamin A ester and 78.5% of the mono-acid vitamin D ester of camphoric acid, respectively.

In the foregoing example the reaction products of the vitamin concentrate and the sodium triphenyl methyl, if desired, may be purified before reaction with the camphoric anhydride by evaporating the mixture under reduced pressure, extracting several times with petroleum ether free of oxygen and peroxides, and redissolving the residue containing the purified vitaminate in ethyl ether. This step removes all material which does not have a reactive hydroxyl group, as well as the triphenyl methane formed by the reaction, and leaves the pure sodium vitaminate.

In administering the foregoing vitamin A and D acid esters and other acid esters presently to be described, one must treat them in a suitable solvent with dilute solutions of one of the alkali metal carbonates, such as lithium, sodium, or potassium, whichever is desired, whereby the vitamin ester salt goes into the aqueous layer. In feeding such an aqueous solution it is highly desirable to sweeten it with sugars or other sweetening ingredients, provided no organic acid is present in these ingredients. Furthermore, the stability of such vitamin preparations is greatly increased if a small amount (0.01% of the vitamin present) of a stabilizer such as $\alpha$- or $\beta$-naphthols are added to the mixture.

EXAMPLE 2

Ten and two tenths (10.2) grams of a vitamin residue obtained from halibut liver oil having a vitamin A potency of over 2,000,000 U. S. P. XI vitamin A units per gram (although vitamin D was present in this sample; its potency was not estimated) was dissolved in anhydrous ethyl ether and titrated against sodium triphenyl methyl until the reddish color of the latter persisted. The mixture was allowed to stand over night at room temperature; then to it was added in excess pure 3-nitro phthalic anhydride, and allowed to stand for two days. Following this, the ether was removed under reduced pressure and petroleum ether substituted to remove most of the unconverted vitamin, hydrocarbons, etc. The petroleum ether extract was filtered and the residue treated with about 150 cc. of water, 100 cc. ethyl ether, and with excess 5% aqueous solution of phosphoric acid. The liberated 3-nitrophthalic acid ester (8.3 grams) was extracted with ether and assayed. It was found to have a potency of approximately 1,900,000 U. S. P. XI vitamin A units per gram.

Using the same procedure as in the foregoing, but substituting phthalic and sulfobenzoic anhydrides for 3-nitrophthalic anhydride, the corresponding phthalic and sulfobenzoic acid esters were successfully prepared.

EXAMPLE 3

Ninety (90) milligrams of a vitamin A concentrate (potency=3,000 U. S. P. XI vitamin A units per mg.) were mixed with excess potassium tertiary butylate in about 25 cc. tertiary butyl alcohol and the mixture heated in an atmosphere of nitrogen at about 70° C. for several hours. To the mixture was then added excess freshly purified naphthalic anhydride and heating was continued while the tertiary butyl alcohol was slowly being distilled under reduced pressure. When all of the latter had been removed, the brown solid residue was extracted several times with petroleum ether in order to remove any unconverted vitamin and other inert material. Following this extraction the residue was treated with a 5% solution of phosphoric acid and the yellowish solid separating extracted with ether, the ether extract dried over anhydrous sodium sulfate and assayed for vitamin A as naphthalic acid ester. The amount of the crude product recovered was about 155 mg. having a potency of approximately 400 vitamin A units per mg.

EXAMPLE 4

A sample of vitamin D concentrate from tuna fish liver oil (potency=2,500,000 vitamin D units per gram) was treated with potassium tertiary butylate in the same manner as with Example 3. The mixture containing the potassium salt of the vitamin was then treated with excess naphthalic anhydride to form the potassium salt of the naphthalic acid ester. Since this salt was found to be slightly soluble in petroleum ether, the barium salt of the acid ester was prepared before extraction by adding to the mixture excess barium hydroxide; then the mixture extracted as before several times with petroleum ether to remove any unconverted vitamin and inert materials. The solid residue consisting of the barium salt of the acid ester of vitamin D and inert inorganic solids was treated with excess saturated solution of oxalic acid whereby the free acid ester of vitamin D separated out and was extracted with ether, the extract dried over sodium sulfate and assayed. It was found to have a potency of 2,300,000 vitamin D units per gram.

The fat-soluble vitamins form vitaminates with the alkali and alkaline earth metals by allowing them to react with the active metal in liquid ammonia as shown by the following illustrative examples:

EXAMPLE 5

A sample (90 mg.) of vitamin A concentrate was dissolved in anhydrous ether and the solution added slowly to a blue solution of sodium in liquid ammonia containing the calculated amount of metallic sodium. The mixture was kept at the temperature of liquid ammonia for one hour, then allowed to warm up to room temperature, whereby the ammonia escaped and the ether was removed finally under reduced pressure. To the residue was added about 30 cc. of ether and excess succinic anhydride and the mixture warmed up to 30–40° C. After two hours of standing at this temperature the ether was removed and the residue extracted several times with petroleum ether in order to remove the unreacted vitamin, etc. The remaining residue was then treated with a saturated solution of oxalic acid and the liberated vitamin A succinic acid ester extracted with ether, dried with anhydrous sodium sulfate, and assayed as succinic acid ester. It was found to have a potency of about 100,000 U. S. P. vitamin A units per gram.

EXAMPLE 6

Another sample (90 mg.) of vitamin A concentrate was treated with metallic calcium in liquid ammonia in the same proportions and under the same conditions as those used under Example 5. No ester was prepared in this case, but instead the solid calcium vitaminate was treated with a saturated solution of oxalic acid whereby the vitamin A liberated was extracted with ether, dried and assayed as before. The potency was found to be about 133,000 U. S. P. vitamin A units per gram.

In the second of the two general methods of making the fat soluble vitamin esters, the vitamins are reacted with polybasic acids or ester forming derivatives thereof including organic dicarboxylic acids, preferably in the presence of a catalyst, and their anhydrides and derivatives such as maleic acid, succinic acid, adipic acid, camphoric acid, phthalic acid and naphthalic acid, oxyhalides of polybasic acids such as phosphorus oxychloride, boric anhydride, dioxane sulfotrioxide, dioxane, di-sulfotrioxide, sulfuryl chloride, sodium chlorsulfonate, 3-nitrophthalic anhydride, etc., in the presence of a tertiary organic base.

A variety of tertiary organic bases may be employed in the process, such as pyridine, quinoline, alpha, beta and gamma picolines, alkyl derivatives of pyridine and quinoline, iso quinoline, acridine, trialkylamines e. g. trimethyl, triethyl and tributylamines, triarylamines, e. g. triphenyl, trinaphthyl and trialylamines, morpholine, etc.

The chemical reactions involved in this method may be illustrated as follows:

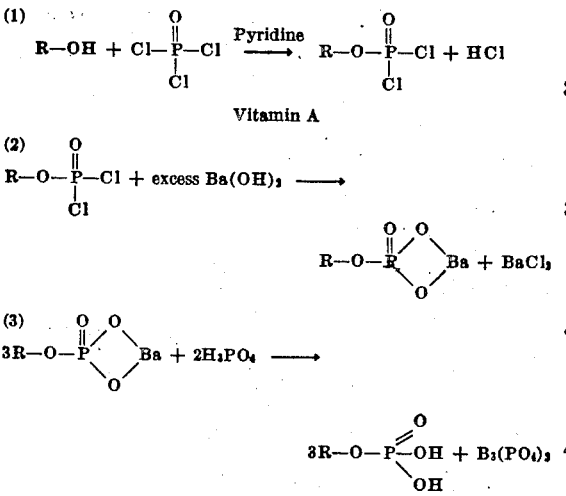

Example 7

To 50 cc. anhydrous ether solution of vitamin A containing approximately 75 mg. of vitamin A was added 2 cc. of anhydrous pyridine and the mixture cooled to about −50° C. and there was added to it, drop by drop, from a micro-pipette 0.03 cc. of phosphorus oxychloride. The temperature was then allowed to rise slowly to about 30° C. and kept there over night. In order to hydrolyze the two chlorine atoms on the phosphorus group, a few crystals of hydrated barium hydroxide were added together with 3 cc. of water and the mixture shaken vigorously. After the two layers separated out the ether layer was removed and the precipitate, water, and pyridine were treated with two grams of barium oxide and extracted twice with fresh ether to remove any unconverted vitamin and the remaining pyridine. The barium salt of the phosphoric acid ester, together with the barium oxide, was treated with about 50 cc. of 5% phosphoric acid and the liberated phosphoric acid ester extracted with ether from the mixture. The ethereal solution was dried with anhydrous sodium sulfate, filtered, and the ether removed under reduced pressure. The residue which was distinctly acid to litmus was recrystallized from methyl alcohol and assayed biologically, both in olive oil and in water solution, as sodium salt (in the presence of small amounts of negative catalysts and ordinary sugar to sweeten the sample).

Example 8

Preparation of 3-nitrophthalic acid ester of vitamin A

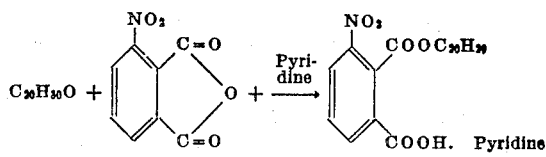

A mixture of 1 g. of vitamin A, 20 cc. of benzene and 5 cc. anhydrous pyridine was placed in a 125 flask fitted with inlet and outlet tubes to pass through the mixture a slow stream of pure nitrogen. To this mixture was added 0.7 g. of pure 3-nitrophthalic anhydride and the resulting mixture allowed to stand at room temperature in an atmosphere of nitrogen for five days. It was then heated to 50–60° for one-half hour, cooled and cold, deoxygenated water added to it. The mixture was then extracted with ethyl ether and the ethereal extract washed twice with dilute phosphoric acid to remove the pyridine. The ether layer was then extracted with sodium carbonate and the aqueous extract re-acidified to free both the excess 3-nitrophthalic acid and the 3-nitrophthalic acid ester. The latter is removed from the mixture by extracting with a 50-50 mixture of ethyl ether-petroleum ether in which the 3-nitrophthalic acid is insoluble.

The invention has been described and illustrated above particularly with reference to the naturally occurring vitamins in the form of concentrates, but it is also applicable to synthetic vitamins and to those produced from e. g. ergosterol and 7-dihydrocholesterol by irradiation with ultra violet light.

I claim:

As a new product, a compound of the formula $C_{20}H_{29}.O.PO_3M$ in which the group $C_{20}H_{29}$ is the hydrocarbon portion of vitamin A and M represents a member of the group consisting of hydrogen and metal.

NICHOLAS A. MILAS.

REFERENCES CITED

The following references are of record in the file of this patent:

UNITED STATES PATENTS

| Number | Name | Date |
|---|---|---|
| 1,799,349 | Bannister | Apr. 7, 1931 |
| 1,837,176 | Horst | Dec. 15, 1931 |
| 2,169,195 | Hickman | Aug. 8, 1939 |

FOREIGN PATENTS

| Number | Country | Date |
|---|---|---|
| 16,994 | Great Britain | 1898 |